Dec. 16, 1952        J. W. LOY        2,621,475
OPERATION OF MULTISTAGE COMBUSTION GAS TURBINES
Filed June 13, 1946
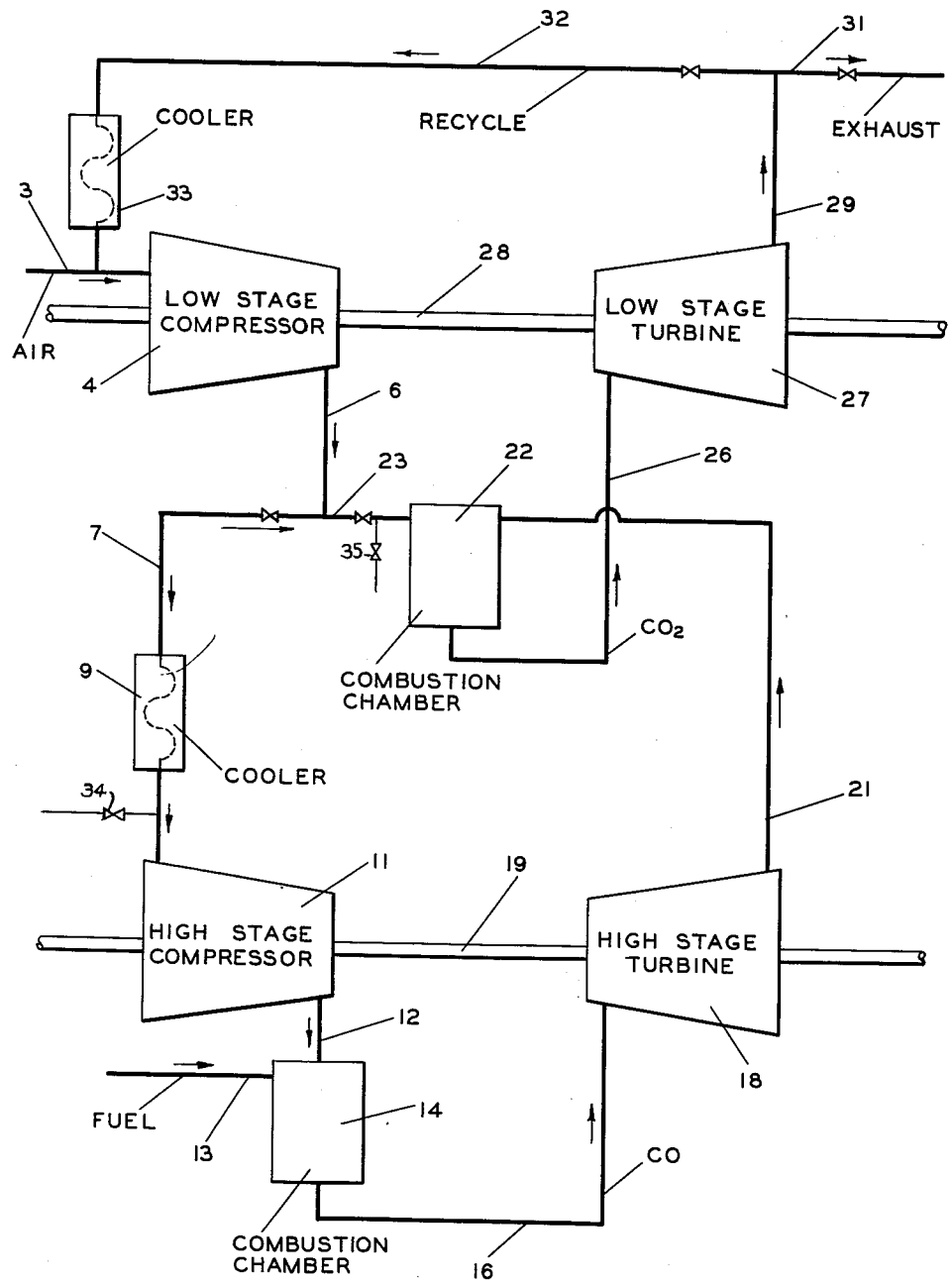
INVENTOR.
J. W. LOY
BY Hudson and Young
ATTORNEYS Patented Dec. 16, 1952

2,621,475

UNITED STATES PATENT OFFICE 2,621,475

OPERATION OF MULTISTAGE COMBUSTION GAS TURBINES

John W. Loy, Bartlesville, Okla., assignor to Phillips Petroleum Company, a corporation of Delaware Application June 13, 1946, Serial No. 676,394

11 Claims. (Cl. 60—39.04)

This invention relates to a power generating system. In one aspect this invention relates to a gas turbine. In another aspect this invention relates to a multistage combustion gas turbine cycle.

In the conventional combustion gas turbine, air in a large excess of fuel burning requirements is compressed in two stages and the air-fuel mixture is burned in a primary combustion chamber. The effluent from the primary combustion chamber passes to a high pressure stage turbine where it is expanded to give off a portion of its available energy as work. The exhaust gases from the high pressure stage turbine at an intermediate pressure, having been cooled by expansion and performance of work, are reheated by combustion with fresh fuel in a second combustion zone and undergo a final expansion in a low stage turbine. The exhaust gases from the low stage turbine are conducted through a regenerator or heating chamber before venting, so as to preheat fresh compressed air to the first combustion step thus increasing thermal efficiency. The large amount of excess air required of this process in order to limit the combustion temperatures to a safe level is of course one of the fundamental drawbacks to present day gas turbines, since the energy loss from inherent inefficiency in air compression and reexpansion represents a large and frequently impractical percentage of the potential fuel energy.

As indicated above, the idea of operating a turbine directly on hot gases generated from combustion at a pressure above that of the turbine outlet is old. Likewise, the advantages of such a scheme, if it were entirely successful, are well known. Some of these advantages include the use of low grade fuels; direct rotary translation of work derived from expanding gases as opposed to reciprocating mechanisms as employed with Otto or diesel cycles; reduction of friction by elimination of parts sliding one upon another; elimination of cumbersome cooling, condensing, and other indirect heat exchange apparatus; etc. Despite the existence of these and other well-known advantages, the combustion gas turbine as a self contained power unit still lacks extensive commercial development. The chief reasons for this slow development are mechanical and metallurgical problems which have been nearly insurmountable and which arise from the necessity of using very high turbine inlet temperatures to attain reasonable efficiency. There is the basic and well-established Carnot principle which describes simply the relation of temperature in a heat engine to its theoretical maximum efficiency:

$$E = \frac{T_2 - T_1}{T_2}$$

where $T_2$ is the inlet and $T_1$ the outlet temperature, respectively, in degrees absolute. A more concrete illustration of the effect of temperature on the efficiency of a combustion gas turbine may be had by considering the large amount of diluent gases which must be admixed with primary combustion products in order to reach a lower temperature prior to the turbine inlet and commensurate with the properties of the turbine material and mechanical characteristics of the turbine construction. Such diluent gases must be compressed the same as the fuel-air components, and usually a major portion of the power input in the compressor is consumed in compressing the diluent portion of the gases fed to the turbine. Much of the work done in compressing the diluent gases is, of course, recovered in the turbine. However, the mechanical efficiency of both the compressor section and the turbine section is usually less than 90 per cent. Therefore, inherent loss of energy attributable to the handling of the diluent gases represents a relatively large fraction of, or may even exceed, the net shaft output to external work. Furthermore, the gross power input to the compressor and the gross output of the turbine are large compared to net shaft output and accordingly, the complete unit tends to be large and unwieldy, thus offsetting some of the theoretical advantages noted above. With higher temperatures, less diluent gases are required and the machine is both more efficient and more compact.

The object of this invention is to provide a novel work cycle.

Another object of this invention is to increase the efficiency of an expansion turbine.

Still another object of this invention is to provide a novel method for limiting the temperature of combustion in a gas turbine system.

It is another object of this invention to decrease the amount of diluent gas necessary in a gas turbine system.

It is still another object of this invention to decrease the general size of power equipment for the same net useful output of a gas turbine system.

Yet another object of this invention is to decrease energy losses attending the handling and compression of gases in a gas turbine system.

Other objects and advantages of this invention will become apparent to those skilled in the art from the accompanying description and disclosure.

According to this invention I partially oxidize fuel to a turbine system in two or more stages and I make use of a catalyst to assist in obtaining smooth combustion characteristics under such conditions of partial oxidation. In the first stage, an air-fuel mixture is burned in admixture with a diluent gas in a first catalyst chamber, under pressure above that of a turbine expansion zone outlet, and in such proportions as to give partial or incomplete combustion. For instance, a hydrocarbon fuel under such conditions of the first stage would yield principally carbon monoxide, carbon dioxide, hydrogen and water. The heat of combustion in this primary or initial stage is less than that resulting from complete combustion and, accordingly, a relatively small proportion of diluent gases as compared to complete combustion is required in order to reduce the outlet combustion temperature to the safe value necessary for operation of the turbine. The primary stage combustion effluent after admixture with a diluent gas then undergoes an intermediate expansion in a primary turbine stage; and, being thus cooled, is led to a second catalyst chamber, admixed with additional air and with additional diluent (if desired) and the combustible constituents of the preceding combustion further oxidized subsequent to a second expansion in a secondary or subsequent turbine stage without the addition of further fuel, and so on. More frequently, only two such cycles are expedient. I have found that with such a scheme, the total amount of diluent gases required in the system is much less than when the conventional complete combustion method is employed. The efficiency of the system as a whole is thus increased and the size of equipment is decreased as much as 25 or 30 per cent. The efficiency is further increased by the important fact that, in the primary stages particularly, the atmosphere of the gases is a reducing one and higher temperatures are permissible in the turbine system without shortening or impairing the life of the metals of construction exposed to the gases. Gases at high temperatures and containing free oxygen are usually very injurious to metals having the physical characteristics requisite for their use in turbine construction, such as carbon-molybdenum and chrome nickel steels.

It is believed that the principles of this invention may be more adequately understood by the discussion of a specific embodiment in connection with the accompanying drawing which forms a part of this application and which illustrates diagrammatically an arrangement of apparatus suitable for practicing this invention. In the particular scheme shown in the drawing, the diluent gas is obtained by recycling a portion of the effluent gases from the final turbine stage and the oxidation steps are balanced in such a way that all of the recycled gas and air are mixed ahead of the compressor intake.

Air at approximately atmospheric temperature and pressure is admixed with a recycle gas from line 32 in line 3. The resulting mixture has a temperature of about 155° F. The mol ratio of air to recycle gas is about 1:3. The mixture of air and recycled gas is compressed in low pressure stage compressor 4, which is a conventional axial flow compressor driven by turbine 27 by means of shaft 28. The compressed mixture at about 60 pounds per square inch absolute leaves compressor 4 through line 6 and is passed through line 7 and cooler 9 into a second high pressure stage compressor 11 which is driven by turbine 18 by means of shaft 19. The gaseous mixture entering cooler 9 is at a temperature of about 400° F. and is cooled thereby to a temperature of about 150° F. prior to entry into high stage compressor 11. The gaseous mixture containing air is compressed to a pressure of about 215 pounds per square inch absolute in high stage compressor 11 and is passed at a temperature of about 400° F. to the first combustion chamber 14 through line 12 where it is admixed with fuel entering through line 13. The fuel comprises any suitable normally gaseous or liquid fuel, such as butane. Combustion may be effected in combustion chamber 14 in the presence of a catalyst, such as bauxite, bauxite impregnated with an alkali metal hydroxide, or nickel. Combustion is effected in combustion zone 14 with about 75 per cent aeration. As defined herein aeration is the percentage of air required for theoretical stoichiometric combustion. The partial combustion effluent from combustion chamber 14 at about 1200° F. is removed therefrom through line 16 and has approximately the composition set forth in Table I.

TABLE I

| Component | Effluent from 1st Combustion Zone Volume per cent | Effluent from 2nd Combustion Zone Volume per cent |
| --- | --- | --- |
| $N_2$ | 71.4 | 73 |
| $H_2$ | 1.9 | |
| $H_2O$ | 13.8 | 15 |
| $CO$ | 1.9 | |
| $CO_2$ | 11.0 | 12 |

The combustion effluent from combustion chamber 14 containing carbon monoxide is passed through line 16 to a high pressure stage turbine 18, such as a multistage reaction turbine, in which the gases are expanded and their available energy utilized as work. The gaseous effluent from high stage turbine 18 at a pressure of about 60 pounds per square inch absolute and at a temperature of about 680° F. is passed through line 21 to a second combustion zone or chamber 22 for further combustion either with or without the presence of a catalyst as desired. Sufficient oxygen is introduced into combustion chamber 22 through line 23 to effect further combustion or, when only two combustion stages are employed, to complete the combustion of the combustible constituents from combustion zone 14. Since the recycled diluent required in the second combustion is substantially the same percentage of diluent in the first combustion zone, the source of the oxygen for completing combustion may be obtained from the first low stage combustion compressor 4. A combustion effluent similar to the composition shown in column 3 of Table I is removed from combustion chamber 22 at a temperature of about 1200° F. and a pressure of about 55 pounds per square inch absolute and is passed through line 26 to a low pressure stage turbine 27, which may comprise a single stage impulse turbine or a multistage reaction turbine. A gaseous effluent is discharged from low stage turbine 27 at a temperature of about 680° F. and at approximately atmospheric pressure through outlet line 29. This gaseous effluent may be discharged to the atmosphere through line 31 or may be recycled to line 3 through line 32 and cooler 33. Cooler 33 cools the exhaust gases from a temperature of about 680° F. to a temperature of about 175° F. Shafts 19 and 28 are usually connected to an electrical generator for producing electricity. Generally, no further fuel is added to the system other than that introduced into the first combustion chamber; however, it is within the scope of this invention to add a small proportion of the fuel in the combustion steps following the initial combustion step.

A particular novelty of the present invention lies in the operation of the first combustion step since in that step incomplete combustion is effected. The combustion in the first step is primarily controlled by supplying an inefficient amount of air for complete combustion. In general, the combustion will be carried out in the presence of a catalyst, such as a nickel catalyst, at a temperature between about 1100 and about 1500 or 1600° F. and a pressure between about 100 and about 500 pounds per square inch absolute. For practical operation the per cent aeration will vary from 85 to about 65 per cent. Incomplete combustion of the first step may be effected in the absence of a catalyst without departing from the scope of this invention. Table II below shows the composition of effluent from an incomplete combustion to step when the per cent aeration is decreased from 100 per cent to the lowest possible per cent to effect combustion for typical fuel gases.

TABLE II

[In volume percent, except aeration]

| | Natural Gas | Coke Oven Gas | Butane |
|---|---|---|---|
| Aeration, percent | 100–65 | 100–53 | 100–60 |
| $CO_2$ | 12.2–6.5 | 10–5 | 14–6 |
| CO | 0–8.5 | 0–10.5 | 0–11 |
| $H_2$ | 0–8.5 | 0–18.5 | 0–15 |
| $H_2O$ | 22–18 | | |
| $CH_4$ | 0–1 | 0–0.5 | 0–0.5 |

The second combustion step, when only two combustion steps are used, is effected under normal combustion conditions such that complete combustion of the effluent from the first combustion step is effected. Complete combustion in the second combustion step is generally effected at a temperature about the same as the first step, between about 1100 and 1600° F., and at a lower pressure than the first step, between 25 and 250 pounds per square inch absolute. As in the first combustion step the second combustion may or may not be carried out in the presence of a catalyst. Also in the second combustion step an excess of air is usually supplied to ensure complete combustion of the combustible constituents from the first combustion step.

For highest efficiency combustion should be effected at as high a temperature as permissible with the type of construction material used; therefore, the various combustion steps will be at approximately the same temperature: When more than two combustion steps are practiced, the pressures during successive combustion steps will be successively lower.

Various changes and alterations may be made in the diagrammatic illustration as shown without departing from the scope of this invention. For example, coolers 33 and 9 may be omitted if desired or cooler 33 may comprise a heat exchanger for the heat exchange of recycle effluent in line 32 with gases entering chamber 22 through line 23 if desired. Effluent gases from high stage turbine 18 and low stage turbine 27 may be heat exchanged with water or other liquid for the purpose of cooling the effluent and generating vapor which vapor may be used directly in the combustion turbine system if desired. Inert diluent gases, such as recycle gas in line 32, need not be derived from the turbine effluent but may be obtained from other external sources. It is evident that the turbine and combustion stages can be balanced in such a manner that no diluent would be required in combustion stages following the first expansion. For example, depending on the properties of the gases employed and the conditions imposed expansion can be great enough in the first turbine stage to reduce the effluent temperature to such an extent that the succeeding combustion does not cause the limiting temperature to be exceeded. Such an arrangement would require that diluent gases in line 32 be separately compressed and mixed with air in line 7 leading to the high stage compressor 11.

The power generating system can be operated by introducing air or air admixed with recycle gas, either compressed or at atmospheric pressure, directly to line 7 through line 34, thereby by-passing compressor 4. In a similar manner air or a mixture of air and recycled gas may be introduced to line 23 via line 35 for introduction to combustion chamber 22.

Also it should be noted that introduction of the entire amount of air and recycle together at the intersection of lines 3 and 32 is not specific nor limiting to this invention but is illustrative of one method of operation of this invention. Where the recycle gas and air are introduced together as shown, the volume of recycle gas is from about 75 to about 50 per cent by volume of the total air-recycle mixture for a paraffinic fuel. The total amount of air is in any case substantially equal to the stoichiometric requirement for complete combustion of all the fuel involved, even though the combustion occurs stepwise in two or more separate stages. Significant changes in variables concerned from the conditions indicated may require that some or all the recycle be compressed separately so that the percentage of the total mixture can be varied between stages to provide proper temperature control.

Appreciable importance should be assigned to the fact that the reducing type of atmosphere of the present invention may permit higher operating temperatures in the turbine and greater efficiency for given useful life or safety factor; or may permit use of alloys having desirable mechanical properties but of low resistance to oxidation because of the reducing atmosphere used in a portion of the system.

It is usually considered mechanically impractical to mount four compressor and turbine elements upon the same shaft. Therefore in order to keep the system in proper balance it frequently is desirable to have some common power interconnection which may be mechanical, hydraulic or electrical. However, if desired and found practical, all the compressors and turbines may be on the same shaft.

Other exothermic reactions besides the combustion of fuel by oxidation may be employed, and other operating conditions such as lower temperatures and higher pressures than those indicated may be found by trial and error by one skilled in the art without departing from the scope of this invention.

The following examples illustrate the comparison of the present invention to the conventional turbine system employing stepwise combustion and is considered merely illustrative and not unnecessarily limiting to the invention.

*Example*

Tables III and IV below show performance characteristics and gas analyses of effluents from a conventional system and a system according to the present invention. By the conventional system is meant complete combustion in the presence of excess air in several stages, e. g. combustion in one stage and expansion and then addition of more fuel and combustion in the second stage and expansion.

TABLE III

*Performance characteristics*

|  | Present Invention | Conventional |
| --- | --- | --- |
| Combustion temperature, °F | 1,200 | 1,200 |
| Overall Brake Thermal Efficiency, percent | 20 | 16 |
| Ratio, Useful output to Gross Turbine H. P. | 0.25 | 0.21 |
| Percent decrease in general size of Power Equipment (same output) | 33 |  |

TABLE IV

*Typical gas analysis of effluent (volume percent)*

|  | Present Invention | | Conventional | |
| --- | --- | --- | --- | --- |
|  | 1st Combustion | 2nd Combustion | 1st Combustion | 2nd Combustion |
| $N_2$ | 71.4 | 73 | 78.3 | 77.5 |
| $O_2$ |  |  | 17.2 | 15.1 |
| $H_2$ | 1.9 |  |  |  |
| $H_2O$ | 13.8 | 15 | 2.5 | 4.1 |
| $CO$ | 1.9 |  |  |  |
| $CO_2$ | 11 | 12 | 2.0 | 3.3 |
|  | 100.0 | 100 | 100.0 | 100.0 |

As indicated in Table III for similar conditions of temperature the overall brake efficiency of the present invention is superior to the efficiency of the conventional type. Furthermore, a substantial decrease in general size of power equipment for the same output may be realized. Through refinements in mechanical equipment and more extensive heat exchange the thermal efficiency of both systems might be improved but the advantages of the subject invention are still retained in comparison. The combustion temperature of 1200° F. is about the same as that employed in commercial turbines at present; however, a lower peak operating temperature indicates even a more favorable efficiency to the new scheme as compared to the conventional scheme. Through employment of more combustion and expansion stages, it is theoretically possible to reduce the percentage of recycle in the gas mixture of the present invention.

Having described my invention, I claim:

1. In the operation of a multistage combustion gas turbine the steps comprising admixing air with an inert diluent gas in a mol ratio between about 1:1 and about 1:3, passing the resulting mixture of air and diluent gas to a first compression zone of relatively low pressure in which zone the resulting mixture is compressed to a pressure between about 25 and about 250 pounds per square inch absolute, cooling a portion of the compressed mixture from said first compression zone, passing said compressed and cooled mixture from said first compression zone to a second compression zone of relatively high pressure in which the mixture is compressed to a pressure between about 100 and about 500 pounds per square inch absolute, passing a compressed mixture from said second compression zone to a first combustion zone, introducing a fluid fuel into said first combustion zone, maintaining the per cent aeration in said first combustion zone between about 85 and about 65 per cent whereby incomplete combustion is effected at a temperature between about 1100 and about 1600° F., passing an effluent containing carbon monoxide from said first combustion zone to a first turbine expansion zone, expanding the effluent from said first combustion zone in said first expansion zone in a manner to produce work, utilizing a portion of the work produced in said first expansion zone to compress the mixture in said second compression zone, passing an expanded effluent from said first expansion zone to a second combustion zone, introducing a portion of the compressed mixture from said first compression zone into said second combustion zone, completing combustion in said second combustion zone of the combustible constituents in the effluent of said first combustion zone at a temperature between about 1100 and about 1600° F., passing an effluent from said second combustion zone to a second turbine expansion zone, expanding the effluent from said second combustion zone in said second expansion zone in a manner to produce work, utilizing a portion of the work produced in said second expansion zone to compress the mixture of air and diluent gas in said first compression zone, removing an expanded effluent from said second expansion zone, and recycling at least a portion of the effluent from said second expansion zone to said first compression zone admixed with air.

2. In the operation of a multistage combustion gas turbine the step comprising admixing air with an inert diluent gas in a mol ratio between about 1:1 and about 1:3, passing the resulting mixture of air and diluent gas to a first compression zone of relatively low pressure in which zone the resulting mixture is compressed to a pressure between about 25 and about 250 pounds per square inch absolute, cooling a portion of the compressed mixture from said first compression zone, passing said compressed and cooled mixture from said first compression zone to a second compression zone of relatively high pressure in which the mixture is compressed to a pressure between about 100 and about 500 pounds per square inch absolute, passing a compressed mixture from said second compression zone to a first combustion zone, introducing a fluid fuel into said first combustion zone, maintaining the per cent aeration in said first combustion zone between about 85 and about 65 per cent whereby incomplete combustion is effected at a temperature between about 1100 and about 1600° F., passing an effluent containing carbon monoxide from said first combustion zone to a first turbine expansion zone, expanding the effluent from said first combustion zone in said first expansion zone in a manner to produce work; passing an expanded effluent from said first expansion zone to a second combustion zone, introducing a portion of the compressed mixture from said first compression zone into said second combustion zone, completing combustion in said second combustion zone of the combustible constituents in the effluent of said first combustion zone at a temperature between about 1100 and about 1600° F., passing an effluent from said second combustion zone to a second turbine expansion zone, expanding the effluent from said second combustion zone in said second expansion zone in a manner to produce work, and removing an expanded effluent from said second expansion zone.

3. In the operation of a multistage combustion gas turbine the steps comprising admixing air with an inert diluent gas, passing the resulting mixture of air and diluent gas to a first compression zone of relatively low pressure in which zone the resulting mixture is compressed, cooling a portion of the compressed mixture from said first compression zone, passing said compressed and cooled mixture from said first compression zone to a second compression zone of relatively high pressure in which the mixture is compressed, passing a compressed mixture from said second compression zone to a first combustion zone, introducing a fluid fuel into said first combustion zone, maintaining less than 100 per cent aeration in said first combustion zone whereby incomplete combustion is effected, passing an effluent containing carbon monoxide from said first combustion zone to a first turbine expansion zone, expanding the effluent from said first combustion zone in said first expansion zone in a manner to produce work, utilizing a portion of the work produced in said first expansion zone to compress the mixture in said second compression zone, passing an expanded effluent from said first expansion zone to a second combustion zone, introducing a portion of the compressed mixture from said first compression zone into said second combustion zone, completing combustion in said second combustion zone of the combustible constituents in the effluent of said first combustion zone, passing an effluent from said second combustion zone to a second turbine expansion zone, expanding the effluent from said second combustion zone in said second expansion zone in a manner to produce work, utilizing a portion of the work produced in said second expansion zone to compress the mixture of air and diluent gas in said first compression zone, removing an expanded effluent from said second expansion zone, and recycling at least a portion of the effluent from said second expansion zone to said first compression zone admixed with air.

4. In the operation of a multistage combustion gas turbine the steps comprising admixing air with an inert diluent gas, passing the resulting mixture of air and diluent gas to a first compression zone of relatively low pressure in which zone the resulting mixture is compressed, cooling a portion of the compressed mixture from said first compression zone, passing said compressed and cooled mixture from said first compression zone to a second compression zone of relatively high pressure in which the mixture is compressed, passing a compressed mixture from said second compression zone to a first combustion zone, introducing a fluid fuel into said first combustion zone, maintaining less than 100 per cent aeration in said first combustion zone whereby incomplete combustion is effected, passing an effluent containing carbon monoxide from said first combustion zone to a first turbine expansion zone, expanding the effluent from said first combustion zone in said first expansion zone in a manner to produce work, passing an expanded effluent from said first expansion zone to a second combustion zone, introducing a portion of the compressed mixture from said first compression zone into said second combustion zone, completing combustion in said second combustion zone of the combustible constituents in the effluent of said first combustion zone, passing an effluent from said second combustion zone to a second turbine expansion zone, expanding the effluent from said second combustion zone in said second expansion zone in a manner to produce work, and removing an expanded effluent from said second expansion zone.

5. In the operation of a multistage combustion gas turbine in which fuel is combusted in at least two combustion steps, the steps comprising admixing a fluid fuel with air and an inert diluent gas in an initial combustion zone at a pressure between about 100 and about 500 pounds per square inch absolute and burning the fuel therein, maintaining aeration between about 85 and about 65 per cent and the mol ratio of air to diluent gas between about 1:1 and about 1:3 whereby incomplete combustion is effected at a temperature between about 1100 and about 1600° F., passing an effluent from said initial combustion zone to an initial turbine expansion zone and expanding the same therein in such a manner as to produce work, admixing an effluent from said initial expansion zone with sufficient air in a subsequent combustion zone at a pressure between about 25 and about 250 pounds per square inch absolute to complete combustion therein without the addition of further fuel to said subsequent combustion zone, at a temperature between about 1100 and about 1600° F., and passing an effluent from said subsequent combustion zone to a subsequent turbine expansion zone and expanding the same therein in such a manner as to produce work.

6. In the operation of a multistage combustion gas turbine in which fuel is burned in at least two combustion stages, the steps comprising, admixing under superatmospheric pressure air and inert diluent gas and fuel in an initial combustion stage, maintaining a mol ratio of air to diluent gas between about 1:1 and about 1:3, combusting fuel in said initial combustion stage, maintaining aeration in said first combustion stage between about 85 and about 65 per cent whereby incomplete combustion of the fuel is effected in the initial combustion stage at a temperature between about 1100 and about 1600° F., expanding an effluent from said initial combustion stage in a turbine in a manner such that work is produced, after expansion of the effluent from said initial combustion stage to produce work combusting the combustible components thereof in a last combustion stage, maintaining at least 100 per cent aeration in said last combustion stage whereby complete combustion of the combustible components is effected at a temperature between about 1100 and about 1600° F., and expanding an effluent from said last combustion stage in a turbine in a manner such that work is produced.

7. In the operation of a multistage combustion gas turbine in which fuel is combusted in at least two combustion steps the steps comprising admixing a fluid fuel with air and an inert diluent gas in an initial combustion zone and burning the fuel therein, maintaining less than 100 per cent aeration whereby incomplete combustion is effected, passing an effluent from said initial combustion zone to an initial turbine expansion zone and expanding the same therein in such a manner as to produce work, admixing an effluent from said initial expansion zone with sufficient air in a subsequent combustion zone to complete combustion therein without the addition of further fuel to said subsequent combustion zone, and passing an effluent from said subsequent combustion zone to a subsequent turbine expansion zone and expanding the same therein in such a manner as to produce work.

8. A combustion gas turbine system which comprises in combination a low pressure compressor of the axial flow type, a high pressure compressor of the axial flow type, a high pressure expansion turbine of the multistage reaction type, a low pressure expansion turbine of the multistage reaction type, a first combustion chamber, a second combustion chamber, each of the aforesaid elements having inlets and outlets, conduit means communicating between the outlet of said low pressure compressor and the inlets of said high pressure compressor and said second combustion chamber, a conduit communicating between the outlet of said high pressure compressor and the inlet of said first combustion chamber, means for introducing fuel into said first combustion chamber, a conduit communicating between the outlet of said first combustion chamber and the inlet of said high pressure turbine, a conduit communicating between the outlet of said high pressure turbine and an inlet of said second combustion chamber, a conduit communicating between the outlet of said second combustion chamber and the inlet of said low pressure turbine, a conduit communication between the outlet of said low pressure turbine and the inlet of said low pressure compressor, means for introducing air into said low pressure compressor, and means for cooling the conduit between said low pressure compressor and said high pressure compressor, the aforesaid means for introducing fuel into the first combustion chamber being the only means for introducing fuel into the system.

9. A combustion gas turbine system which comprises in combination a low pressure compressor, a high pressure compressor, a high pressure expansion turbine, a low pressure expansion turbine, a first combustion chamber, a second combustion chamber, each of the aforesaid elements having inlets and outlets, conduit means communicating between the outlet of said low pressure compressor and the inlets of said high pressure compressor and said second combustion chamber, a conduit communicating between the outlet of said high pressure compressor and the inlet of said first combustion chamber, means for introducing fuel into said first combustion chamber, a conduit communicating between the outlet of said first combustion chamber and the inlet of said high pressure turbine, a conduit communicating between the outlet of said high pressure turbine and an inlet of said second combustion chamber, a conduit communicating between the outlet of said second combustion chamber and the inlet of said low pressure turbine, and means for introducing air into said low pressure compressor, the aforesaid means for introducing fuel into the first combustion chamber being the only means for introducing fuel into the system.

10. A combustion gas turbine system which comprises in combination a compressor, a high pressure expansion turbine, a low pressure expansion turbine, a first combustion chamber, a second combustion chamber, each of the aforesaid elements having inlets and outlets, conduit means communicating between the outlet of said compressor and the inlets of said first combustion chamber and said second combustion chamber, means for introducing fuel into said first combustion chamber, a conduit communicating between the outlet of said first combustion chamber and the inlet of said high pressure turbine, a conduit communicating between the outlet of said high pressure turbine and an inlet of said second combustion chamber, a conduit communicating between the outlet of said second combustion chamber and the inlet of said low pressure turbine, and means for introducing air into said compressor, the aforesaid means for introducing fuel into the first combustion chamber being the only means for introducing fuel into the system.

11. A combustion gas turbine system which comprises in combination a high pressure expansion turbine, a low pressure expansion turbine, a first combustion chamber, a second combustion chamber, each of the aforesaid elements having inlets and outlets, means for introducing fuel into said first combustion chamber, a conduit communicating between the outlet of said first combustion chamber and the inlet of said high pressure turbine, a conduit communicating between the outlet of said high pressure turbine and an inlet of said second combustion chamber, and a conduit communicating between the outlet of said second combustion chamber and the inlet of said low pressure turbine, the aforesaid means for introducing fuel into the first combustion chamber being the only means for introducing fuel into the system.

JOHN W. LOY.

REFERENCES CITED

The following references are of record in the file of this patent:

UNITED STATES PATENTS

| Number | Name | Date |
|---|---|---|
| 2,095,991 | Lysholm | Oct. 19, 1937 |
| 2,245,562 | Becker | June 17, 1941 |
| 2,245,954 | Anxionnaz | June 17, 1941 |
| 2,407,165 | Kreitner | Sept. 3, 1946 |
| 2,407,166 | Kreitner | Sept. 3, 1946 |
| 2,456,402 | Goddard | Dec. 14, 1948 |
| 2,476,031 | Farkas | July 12, 1949 |
| 2,490,064 | Kollsman | Dec. 6, 1949 |
| 2,511,385 | Udale | June 13, 1950 |